(12) United States Patent
Libman

(10) Patent No.: US 7,310,618 B2
(45) Date of Patent: Dec. 18, 2007

(54) AUTOMATED LOAN EVALUATION SYSTEM

(75) Inventor: Brian L. Libman, New Canaan, CT (US)

(73) Assignee: Lehman Brothers Inc., New York, NY (US)

( * ) Notice: Subject to any disclaimer, the term of this patent is extended or adjusted under 35 U.S.C. 154(b) by 1499 days.

(21) Appl. No.: 09/790,374

(22) Filed: Feb. 21, 2001

(65) Prior Publication Data

US 2007/0043654 A1    Feb. 22, 2007

Related U.S. Application Data

(60) Provisional application No. 60/184,150, filed on Feb. 22, 2000.

(51) Int. Cl.
*G06Q 40/00* (2006.01)
(52) U.S. Cl. .................................................. 705/38
(58) Field of Classification Search .............. 705/36 R, 705/38, 7, 35, 39
See application file for complete search history.

(56) References Cited

U.S. PATENT DOCUMENTS 5,611,052 A * 3/1997 Dykstra et al. ............... 705/38
5,870,721 A * 2/1999 Norris ........................... 705/38
6,567,791 B2 * 5/2003 Lent et al. .................... 705/38
2001/0032158 A1 * 10/2001 Starkman .................... 705/36
2001/0032159 A1 * 10/2001 Starkman .................... 705/36

OTHER PUBLICATIONS

The Price of Mortgage: OFHEO, 1997, Report to Congress.*
FDIC: National Regional Outlook, First Quartr 1999: Hihg Loan-to-Value Lending: A New Frontier in Home Equity Lending.*

* cited by examiner

*Primary Examiner*—Hani M. Kazimi
*Assistant Examiner*—Olabode Akintola
(74) *Attorney, Agent, or Firm*—Morgan, Lewis & Bockius LLP; Steven D. Underwood; Pristine Johannessen

(57) ABSTRACT

In at least one aspect, the present invention comprises a system and method of creating a probability of delinquency database using historical loan data and a plurality of loan factors, for use in determining a loan rate, the method comprising: identifying a plurality of multi-level loan factors; creating a pool from the historic loan data, wherein the first pool contains records relating to the plurality of multi-level loan factors; separating the pool into a set of groups based on the multi-level loan factors, calculating a probability of delinquency for each group; and arranging the probability of delinquency for each group into a database such that the probability of delinquency for each group is accessible for any combination of multi-level loan factors.

6 Claims, 15 Drawing Sheets

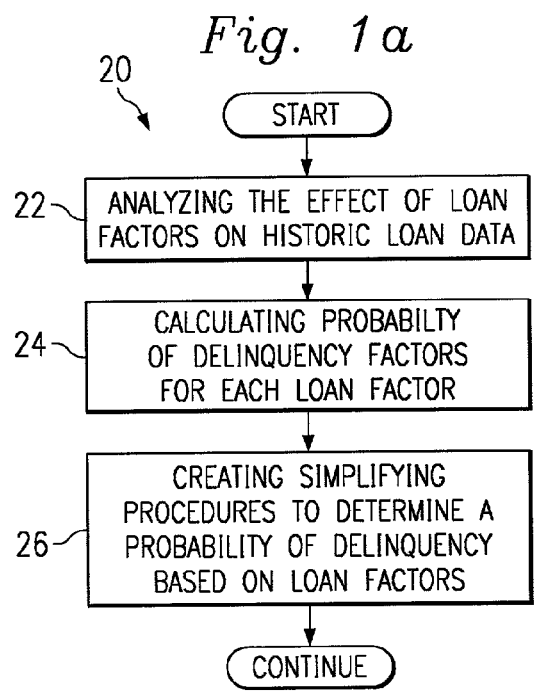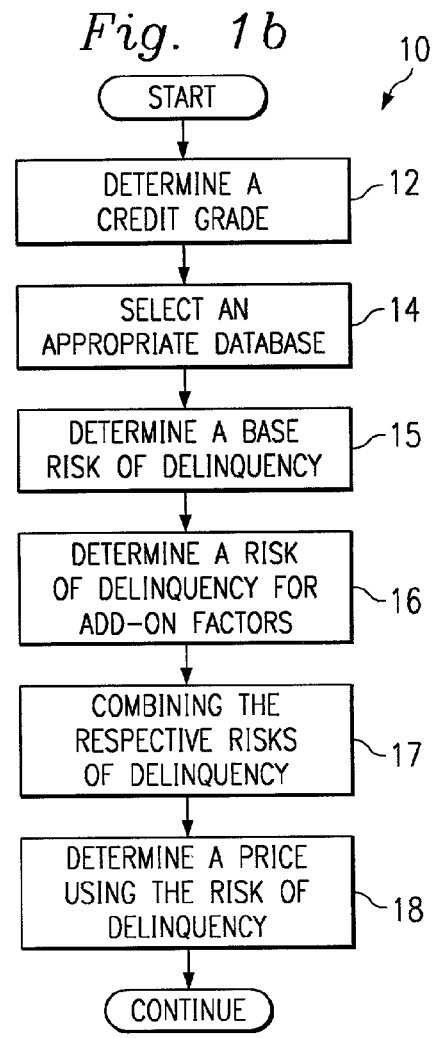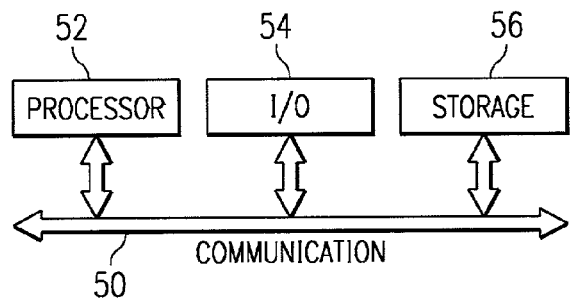

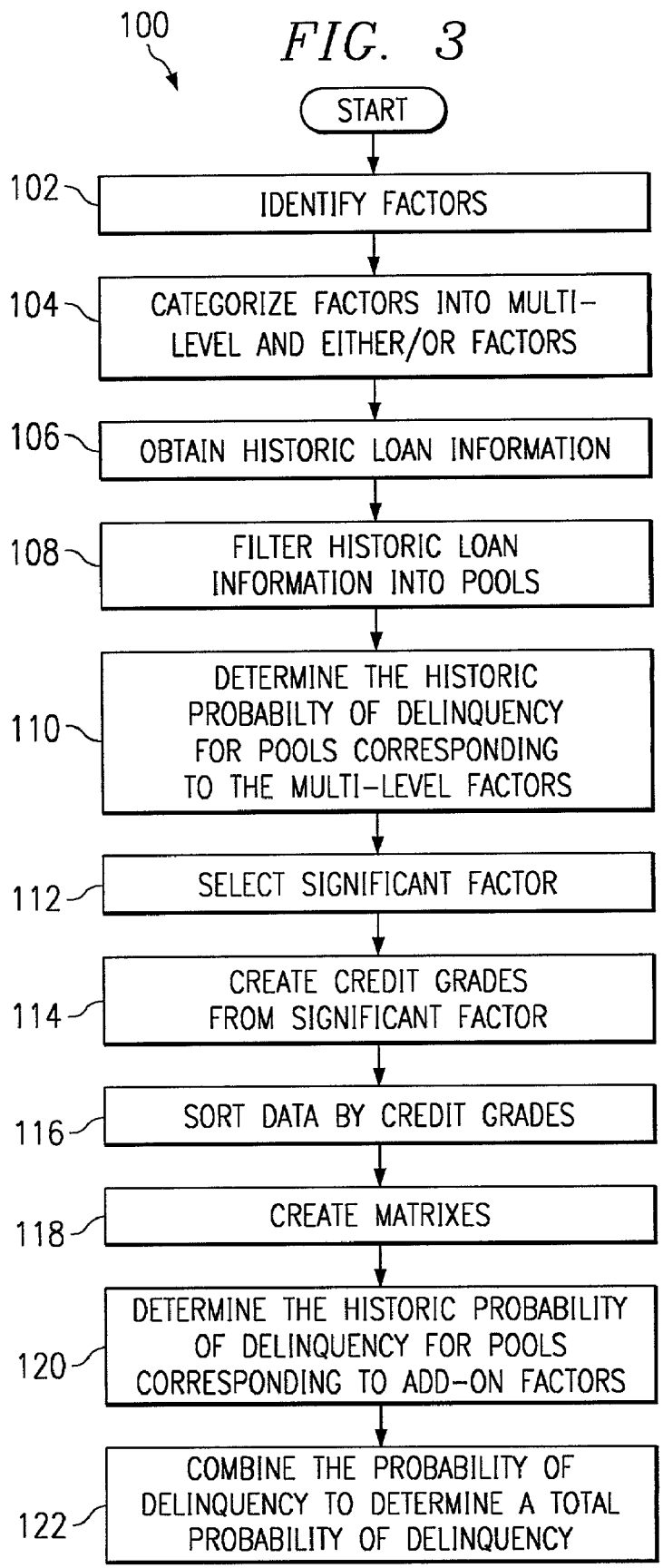

| LTV | NUMBER OF LOANS | INCIDENCE OF DELINQUENCY* | PROBABILITY OF DELINQUENCY (c) ÷ (b) |
|---|---|---|---|
| 90-94 | 1000 | 189 | .189 |
| 80-89 | 3000 | 423 | .141 |
| 80-84 | 3000 | 378 | .126 |
| 75-79 | 3000 | 312 | .104 |
| 70-74 | 2000 | 203 | .101 |
| 65-69 | 2000 | 198 | .099 |
| <65 | 1000 | 97 | .097 |
| TOTALS | 15,000 | 1800 | .120 |

| MORTGAGE PAY HISTORY | NUMBER OF LOANS | INCIDENCE OF DELINQUENCY | PROBABILITY OF DELINQUENCY (c) ÷ (b) |
|---|---|---|---|
| 1x150 | 1000 | 401 | .401 |
| 1x120 | 1500 | 352 | .235 |
| 3x60 | 1500 | 164 | .109 |
| 1x60 + 1x90 | 2250 | 245 | .109 |
| 6x30 | 3000 | 329 | .110 |
| 2x30 + 1x60 | 2500 | 156 | .062 |
| 4x30 | 1500 | 95 | .063 |
| 2x30 | 1000 | 47 | .031 |
| 1x30 | 750 | 11 | .015 |
| TOTALS | 15,000 | 1800 | .120 |

AVERAGE 90+ DELINQUENCIES ON 12th PAYMENT DATE FOR LOANS WHERE BORROWER'S MORTGAGE PAY HISTORY FOR 12 MONTHS PRECEDING ORIGINATION WAS AS STATED ON THE Y AXIS

| CREDIT REPORTING SCORE | NUMBER OF LOANS | INCIDENCE OF DELINQUENCY | PROBABILITY OF DELINQUENCY |
|---|---|---|---|
| 680 | 200 | 17 | .085 |
| 670 | 500 | 45 | .090 |
| 660 | 1000 | 101 | .101 |
| 650 | 1500 | 165 | .110 |
| 640 | 1000 | 117 | .117 |
| 630 | 1000 | 108 | .108 |
| 620 | 1500 | 167 | .111 |
| 610 | 1500 | 169 | .113 |
| 600 | 1000 | 116 | .116 |
| 590 | 1000 | 127 | .127 |
| 580 | 1000 | 126 | .126 |
| 570 | 1000 | 134 | .134 |
| 560 | 1000 | 146 | .146 |
| 550 | 500 | 71 | .142 |
| 540 | 500 | 73 | .146 |
| 530 | 400 | 59 | .148 |
| 520 | 400 | 60 | .150 |
| TOTALS | 15,000 | 1800 | .120 |

CREDIT GRADE A

| CREDIT REPORTING SCORE | LTV → | | | | | |
|---|---|---|---|---|---|---|
| | 65 | 70 | 75 | 80 | 85 | 90 |
| 680 | 0 | 0 | 0 | .0156 | .0624 | .0936 |
| 670 | 0 | 0 | 0 | .0156 | .0624 | .0936 |
| 660 | 0 | 0 | .0156 | .0312 | .0624 | .0936 |
| 650 | 0 | 0 | .0156 | .0312 | .0624 | .0936 |
| 640 | 0 | 0 | .0312 | .0468 | .0624 | .1092 |
| 630 | 0 | .0156 | .0312 | .0468 | .0780 | .1092 |
| 620 | 0 | .0156 | .0312 | .0468 | .0780 | .1248 |
| 610 | 0 | .0156 | .0312 | .0468 | .0936 | .1248 |
| 600 | 0 | .0312 | .0312 | .0468 | .0936 | .1404 |
| 590 | 0 | .0312 | .0312 | .0624 | .1092 | .1404 |
| 580 | 0 | .0312 | .0312 | .0624 | .1248 | .1506 |
| 570 | 0 | .0312 | .0312 | .0624 | .1248 | |
| 560 | 0 | .0312 | .0468 | .0624 | .1248 | |
| 550 | 0 | .0312 | .0468 | .0780 | .1248 | |
| 540 | 0 | .0312 | .0624 | .0780 | | |
| 530 | 0 | .0468 | .0624 | .0936 | | |
| 520 | 0 | .0468 | .0780 | .0936 | | |

*Fig. 5a*

CREDIT GRADE A−

| CREDIT REPORTING SCORE ↓ / LTV → | 65 | 70 | 75 | 80 | 85 | 90 |
|---|---|---|---|---|---|---|
| 680 | .0156 | .0156 | .0156 | .0312 | .0780 | .1092 |
| 670 | .0156 | .0156 | .0156 | .0312 | .0780 | .1092 |
| 660 | .0156 | .0156 | .0312 | .0468 | .0780 | .1092 |
| 650 | .0156 | .0156 | .0312 | .0468 | .0780 | .1092 |
| 640 | .0156 | .0156 | .0468 | .0624 | .0780 | .1248 |
| 630 | .0156 | .0312 | .0468 | .0624 | .0936 | .1248 |
| 620 | .0156 | .0312 | .0468 | .0624 | .0936 | .1404 |
| 610 | .0156 | .0312 | .0468 | .0624 | .1092 | .1404 |
| 600 | .0156 | .0468 | .0468 | .0624 | .1092 | .1506 |
| 590 | .0156 | .0468 | .0468 | .0780 | .1248 | .1506 |
| 580 | .0156 | .0468 | .0468 | .0780 | .1404 | .1716 |
| 570 | .0156 | .0468 | .0468 | .0780 | .1404 | |
| 560 | .0156 | .0468 | .0624 | .0780 | .1404 | |
| 550 | .0156 | .0468 | .0624 | .0936 | .1404 | |
| 540 | .0156 | .0468 | .0780 | .0936 | | |
| 530 | .0156 | .0624 | .0780 | .1092 | | |
| 520 | .0156 | .0624 | .0936 | .1092 | | |

*Fig. 5b*

CREDIT GRADE B

| CREDIT REPORTING SCORE / LTV → | 65 | 70 | 75 | 80 | 85 | 90 |
|---|---|---|---|---|---|---|
| 680 | .0468 | .0468 | .0468 | .0624 | .1092 | .1404 |
| 670 | .0468 | .0468 | .0468 | .0624 | .1092 | .1404 |
| 660 | .0468 | .0468 | .0624 | .0780 | .1092 | .1404 |
| 650 | .0468 | .0468 | .0624 | .0780 | .1092 | .1404 |
| 640 | .0468 | .0468 | .0780 | .0936 | .1092 | .1506 |
| 630 | .0468 | .0624 | .0780 | .0936 | .1248 | .1506 |
| 620 | .0468 | .0624 | .0780 | .0936 | .1248 | .1716 |
| 610 | .0468 | .0624 | .0780 | .0936 | .1404 | .1716 |
| 600 | .0468 | .0780 | .0780 | .0936 | .1404 | .1872 |
| 590 | .0468 | .0780 | .0780 | .1092 | .1506 | .1872 |
| 580 | .0468 | .0780 | .0780 | .1092 | .1716 | .2028 |
| 570 | .0468 | .0780 | .0780 | .1092 | .1716 | |
| 560 | .0468 | .0780 | .0936 | .1092 | .1716 | |
| 550 | .0468 | .0780 | .0936 | .1248 | .1716 | |
| 540 | .0468 | .0780 | .1092 | .1248 | | |
| 530 | .0468 | .0936 | .1092 | .1404 | | |
| 520 | .0468 | .0936 | .1248 | .1404 | | |

*Fig. 5c*

CREDIT GRADE C

| CREDIT REPORTING SCORE ↓ / LTV → | 65 | 70 | 75 | 80 | 85 | 90 |
|---|---|---|---|---|---|---|
| 680 | .1092 | .1092 | .1092 | .1248 | .1716 | |
| 670 | .1092 | .1092 | .1092 | .1248 | .1716 | |
| 660 | .1092 | .1092 | .1248 | .1404 | .1716 | |
| 650 | .1092 | .1092 | .1248 | .1404 | .1716 | |
| 640 | .1092 | .1092 | .1404 | .1506 | .1716 | |
| 630 | .1092 | .1248 | .1404 | .1506 | .1872 | |
| 620 | .1092 | .1248 | .1404 | .1506 | .1872 | |
| 610 | .1092 | .1248 | .1404 | .1506 | .2028 | |
| 600 | .1092 | .1404 | .1404 | .1506 | .2028 | |
| 590 | .1092 | .1404 | .1404 | .1716 | | |
| 580 | .1092 | .1404 | .1404 | .1716 | | |
| 570 | .1092 | .1404 | .1404 | .1716 | | |
| 560 | .1092 | .1404 | .1506 | .1716 | | |
| 550 | .1092 | .1404 | .1506 | .1872 | | |
| 540 | .1092 | .1404 | .1716 | .1872 | | |
| 530 | .1092 | .1506 | .1716 | .2028 | | |
| 520 | .1092 | .1506 | .1872 | .2028 | | |

LTV → CREDIT GRADE D

| CREDIT REPORTING SCORE ↓ | 65 | 70 | 75 | 80 | 85 | 90 |
|---|---|---|---|---|---|---|
| 680 | .2184 | .2184 | .2184 | | | |
| 670 | .2184 | .2184 | .2184 | | | |
| 660 | .2184 | .2184 | .2340 | | | |
| 650 | .2184 | .2184 | .2340 | | | |
| 640 | .2184 | .2184 | .2496 | | | |
| 630 | .2184 | .2340 | .2496 | | | |
| 620 | .2184 | .2340 | .2496 | | | |
| 610 | .2184 | .2340 | .2496 | | | |
| 600 | .2184 | .2496 | .2496 | | | |
| 590 | .2184 | .2496 | .2496 | | | |
| 580 | .2184 | .2496 | .2496 | | | |
| 570 | .2184 | .2496 | | | | |
| 560 | .2184 | .2496 | | | | |
| 550 | .2184 | .2496 | | | | |
| 540 | .2184 | .2496 | | | | |
| 530 | .2184 | | | | | |
| 520 | .2184 | | | | | |

*Fig. 6*

| ADD ON'S | | | |
|---|---|---|---|
| ALTERNATIVE DOC | 0.25 | DTI>45 AND ≤50 | 0.50 |
| STATED DOC (SELF-EMPLOYED ONLY) | 0.75 | DTI>50 AND ≤55 | 0.75 |
| 3 TO 4 UNIT | 0.25 | BL13 CURRENT AND FULL MORTGAGE PAYMENTS (INSIDE OR OUTSIDE PLAN) IN THE LAST 12 MONTHS | 2.00 |
| NON OWNER OCCUPIED | 0.50 | BK 13 IF WAGES ARE GARNISHED TO MAKE A PLAN PAYMENT OR IF THE PLAN PAYMENT IS DELINQUENT IN LAST 12 MONTHS | 3.25 |
| CLTV>95% | 0.25 | | |
| CASH-OUT | 0.50 | | |
| NO PREVIOUS MORTGAGE HISTORY | 0.25 | | |

FIG. 7

Mortgage Rating
- Subject party is Owner Occupied–Rating will be based solely on the lien on the property that has the worst payment history. A delinquent 2nd or 3rd can outweight the 1st.
- Subject property in Non Owner Occupied–Rating will be based on the worst mortgage history; either the subject property or the borrower's primary residence.

Absence of a Mortgage
- Free and clear only in the absence of a Mortgage rating the credit score will determine the grade for mapping on the FAAST Matrix.
  600+=A  575+=A-  550+=B  530+=C  500+=D
- All others if no proof of mortgage or rental history grade a "D".

Absence of a credit score
- In the absence of a credit score, the Mortgage rating will determine the grade for mapping on the FAAST Matrix.
  A=600  A-=575  B=550  C=530  D=500

Rolling Mortgage Late Count Method
- Rolling 30's are acceptable. 30x30x30x30x30x30=1x30.
- 7 or more 30x=2x30.
- For rolling 60's and 90's count each occurrence.

BK 13
- If Mortgage payment is included in BK (1st or 2nd), full PITI must be paid as agreed and current. If less than full PITI is paid, loan will be graded as a "D".
- If mortgage is paid outside of BK standard grading will apply.

Consumer Credit Counseling
- Treat as BK 13

Second Homes
- Second Homes will be treated as Non Owner occupied properties.

Rural Properties & Manufactured Homes
- A 5% LTV reduction will apply for rural properties or manufactured housing.
- If a property is rural _and_ manufactured, the LTV reduction is 10%.

Forbearance
- All loans subject to a forbearance agreement within the last 12 months will be graded as a "D".

Rental Properties' vacancy factor calculation
- 1-5 rental properties-use 5% vacancy factor for DTI calculation=(95% of gross rents).
- 6+ rental properties-use 20% vacancy factor for DTI calculation=(80% of gross rentals).

Delinquent Property Tax Rule
- Delinquent Property Tax not considered in mortgage rating.

95% LTV Program
- See Program guidelines and rate sheet. Special guidelines apply.

CREDIT REPORTING SOURCE ↓    LTV →    "A" 1x30

| | 60 | 65 | 70 | 75 | 80 | 85 | 90 | 95 |
|---|---|---|---|---|---|---|---|---|
| 680 | 1.00 | 1.00 | 1.00 | 1.00 | 1.25 | 2.00 | 2.50 | |
| 675 | 1.00 | 1.00 | 1.00 | 1.00 | 1.25 | 2.00 | 2.50 | |
| 670 | 1.00 | 1.00 | 1.00 | 1.00 | 1.25 | 2.00 | 2.50 | |
| 665 | 1.00 | 1.00 | 1.00 | 1.00 | 1.50 | 2.00 | 2.50 | |
| 660 | 1.00 | 1.00 | 1.00 | 1.25 | 1.50 | 2.00 | 2.50 | |
| 655 | 1.00 | 1.00 | 1.00 | 1.25 | 1.50 | 2.00 | 2.50 | |
| 650 | 1.00 | 1.00 | 1.00 | 1.25 | 1.50 | 2.00 | 2.50 | |
| 645 | 1.00 | 1.00 | 1.00 | 1.25 | 1.75 | 2.00 | 2.75 | |
| 640 | 1.00 | 1.00 | 1.00 | 1.50 | 1.75 | 2.00 | 2.75 | |
| 635 | 1.00 | 1.00 | 1.25 | 1.50 | 1.75 | 2.25 | 2.75 | |
| 630 | 1.00 | 1.00 | 1.25 | 1.50 | 1.75 | 2.25 | 2.75 | |
| 625 | 1.00 | 1.00 | 1.25 | 1.50 | 1.75 | 2.25 | 3.00 | |
| 620 | 1.00 | 1.00 | 1.25 | 1.50 | 1.75 | 2.25 | 3.00 | |
| 615 | 1.00 | 1.00 | 1.25 | 1.50 | 1.75 | 2.50 | 3.00 | |
| 610 | 1.00 | 1.00 | 1.25 | 1.50 | 1.75 | 2.50 | 3.00 | |
| 605 | 1.00 | 1.00 | 1.50 | 1.50 | 1.75 | 2.50 | 3.25 | |
| 600 | 1.00 | 1.00 | 1.50 | 1.50 | 1.75 | 2.50 | 3.25 | |
| 595 | 1.00 | 1.00 | 1.50 | 1.50 | 2.00 | 2.75 | 3.25 | |
| 590 | 1.00 | 1.00 | 1.50 | 1.50 | 2.00 | 2.75 | 3.25 | |
| 585 | 1.00 | 1.00 | 1.50 | 1.50 | 2.00 | 3.00 | 3.50 | |
| 580 | 1.00 | 1.00 | 1.50 | 1.50 | 2.00 | 3.00 | 3.50 | |
| 575 | 1.00 | 1.00 | 1.50 | 1.50 | 2.00 | 3.00 | 3.50 | |
| 570 | 1.00 | 1.00 | 1.50 | 1.50 | 2.00 | 3.00 | | |
| 565 | 1.00 | 1.00 | 1.50 | 1.75 | 2.00 | 3.00 | | |
| 560 | 1.00 | 1.00 | 1.50 | 1.75 | 2.00 | 3.00 | | |
| 555 | 1.00 | 1.00 | 1.50 | 1.75 | 2.00 | 3.00 | | |
| 550 | 1.00 | 1.00 | 1.50 | 1.75 | 2.25 | 3.00 | | |
| 545 | 1.00 | 1.00 | 1.50 | 1.75 | 2.25 | | | |
| 540 | 1.00 | 1.00 | 1.50 | 2.00 | 2.25 | | | |
| 535 | 1.00 | 1.00 | 1.50 | 2.00 | 2.50 | | | |
| 530 | 1.00 | 1.00 | 1.75 | 2.00 | 2.50 | | | |
| 525 | 1.00 | 1.00 | 1.75 | 2.25 | 2.50 | | | |
| 520 | 1.00 | 1.00 | 1.75 | 2.25 | 2.50 | | | |
| 515 | 1.00 | 1.00 | 1.75 | 2.25 | | | | |
| 510 | 1.00 | 1.00 | 1.75 | 2.50 | | | | |
| 505 | 1.00 | 1.00 | 2.00 | 2.50 | | | | |
| 500 | 1.00 | 1.00 | 2.00 | 2.50 | | | | |

*Fig. 8a*

CREDIT REPORTING SOURCE ↓   LTV →   "A−" 2x30

| | 60 | 65 | 70 | 75 | 80 | 85 | 90 | 95 |
|---|---|---|---|---|---|---|---|---|
| 680 | 1.25 | 1.25 | 1.25 | 1.25 | 1.50 | 2.25 | 2.75 | |
| 675 | 1.25 | 1.25 | 1.25 | 1.25 | 1.50 | 2.25 | 2.75 | |
| 670 | 1.25 | 1.25 | 1.25 | 1.25 | 1.50 | 2.25 | 2.75 | |
| 665 | 1.25 | 1.25 | 1.25 | 1.25 | 1.75 | 2.25 | 2.75 | |
| 660 | 1.25 | 1.25 | 1.25 | 1.50 | 1.75 | 2.25 | 2.75 | |
| 655 | 1.25 | 1.25 | 1.25 | 1.50 | 1.75 | 2.25 | 2.75 | |
| 650 | 1.25 | 1.25 | 1.25 | 1.50 | 1.75 | 2.25 | 2.75 | |
| 645 | 1.25 | 1.25 | 1.25 | 1.50 | 2.00 | 2.25 | 3.00 | |
| 640 | 1.25 | 1.25 | 1.25 | 1.75 | 2.00 | 2.25 | 3.00 | |
| 635 | 1.25 | 1.25 | 1.50 | 1.75 | 2.00 | 2.50 | 3.00 | |
| 630 | 1.25 | 1.25 | 1.50 | 1.75 | 2.00 | 2.50 | 3.00 | |
| 625 | 1.25 | 1.25 | 1.50 | 1.75 | 2.00 | 2.50 | 3.25 | |
| 620 | 1.25 | 1.25 | 1.50 | 1.75 | 2.00 | 2.50 | 3.25 | |
| 615 | 1.25 | 1.25 | 1.50 | 1.75 | 2.00 | 2.75 | 3.25 | |
| 610 | 1.25 | 1.25 | 1.50 | 1.75 | 2.00 | 2.75 | 3.25 | |
| 605 | 1.25 | 1.25 | 1.75 | 1.75 | 2.00 | 2.75 | 3.50 | |
| 600 | 1.25 | 1.25 | 1.75 | 1.75 | 2.00 | 2.75 | 3.50 | |
| 595 | 1.25 | 1.25 | 1.75 | 1.75 | 2.25 | 3.00 | 3.50 | |
| 590 | 1.25 | 1.25 | 1.75 | 1.75 | 2.25 | 3.00 | 3.50 | |
| 585 | 1.25 | 1.25 | 1.75 | 1.75 | 2.25 | 3.25 | 3.75 | |
| 580 | 1.25 | 1.25 | 1.75 | 1.75 | 2.25 | 3.25 | 3.75 | |
| 575 | 1.25 | 1.25 | 1.75 | 1.75 | 2.25 | 3.25 | 3.75 | |
| 570 | 1.25 | 1.25 | 1.75 | 1.75 | 2.25 | 3.25 | | |
| 565 | 1.25 | 1.25 | 1.75 | 2.00 | 2.25 | 3.25 | | |
| 560 | 1.25 | 1.25 | 1.75 | 2.00 | 2.25 | 3.25 | | |
| 555 | 1.25 | 1.25 | 1.75 | 2.00 | 2.25 | 3.25 | | |
| 550 | 1.25 | 1.25 | 1.75 | 2.00 | 2.50 | 3.25 | | |
| 545 | 1.25 | 1.25 | 1.75 | 2.00 | 2.50 | | | |
| 540 | 1.25 | 1.25 | 1.75 | 2.25 | 2.50 | | | |
| 535 | 1.25 | 1.25 | 1.75 | 2.25 | 2.75 | | | |
| 530 | 1.25 | 1.25 | 2.00 | 2.25 | 2.75 | | | |
| 525 | 1.25 | 1.25 | 2.00 | 2.50 | 2.75 | | | |
| 520 | 1.25 | 1.25 | 2.00 | 2.50 | 2.75 | | | |
| 515 | 1.25 | 1.25 | 2.00 | 2.50 | | | | |
| 510 | 1.25 | 1.25 | 2.00 | 2.75 | | | | |
| 505 | 1.25 | 1.25 | 2.25 | 2.75 | | | | |
| 500 | 1.25 | 1.25 | 2.25 | 2.75 | | | | |

*Fig. 8b*

CREDIT REPORTING SOURCE ↓    LTV →    "B" 4x30 OR 2x30 & 1x60

| | 60 | 65 | 70 | 75 | 80 | 85 | 90 | 95 |
|---|---|---|---|---|---|---|---|---|
| 680 | 1.75 | 1.75 | 1.75 | 1.75 | 2.00 | 2.75 | 3.25 | |
| 675 | 1.75 | 1.75 | 1.75 | 1.75 | 2.00 | 2.75 | 3.25 | |
| 670 | 1.75 | 1.75 | 1.75 | 1.75 | 2.00 | 2.75 | 3.25 | |
| 665 | 1.75 | 1.75 | 1.75 | 1.75 | 2.25 | 2.75 | 3.25 | |
| 660 | 1.75 | 1.75 | 1.75 | 2.00 | 2.25 | 2.75 | 3.25 | |
| 655 | 1.75 | 1.75 | 1.75 | 2.00 | 2.25 | 2.75 | 3.25 | |
| 650 | 1.75 | 1.75 | 1.75 | 2.00 | 2.25 | 2.75 | 3.25 | |
| 645 | 1.75 | 1.75 | 1.75 | 2.00 | 2.50 | 2.75 | 3.50 | |
| 640 | 1.75 | 1.75 | 1.75 | 2.25 | 2.50 | 2.75 | 3.50 | |
| 635 | 1.75 | 1.75 | 2.00 | 2.25 | 2.50 | 3.00 | 3.50 | |
| 630 | 1.75 | 1.75 | 2.00 | 2.25 | 2.50 | 3.00 | 3.50 | |
| 625 | 1.75 | 1.75 | 2.00 | 2.25 | 2.50 | 3.00 | 3.75 | |
| 620 | 1.75 | 1.75 | 2.00 | 2.25 | 2.50 | 3.00 | 3.75 | |
| 615 | 1.75 | 1.75 | 2.00 | 2.25 | 2.50 | 3.25 | 3.75 | |
| 610 | 1.75 | 1.75 | 2.00 | 2.25 | 2.50 | 3.25 | 3.75 | |
| 605 | 1.75 | 1.75 | 2.25 | 2.25 | 2.50 | 3.25 | 4.00 | |
| 600 | 1.75 | 1.75 | 2.25 | 2.25 | 2.50 | 3.25 | 4.00 | |
| 595 | 1.75 | 1.75 | 2.25 | 2.25 | 2.75 | 3.50 | 4.00 | |
| 590 | 1.75 | 1.75 | 2.25 | 2.25 | 2.75 | 3.50 | 4.00 | |
| 585 | 1.75 | 1.75 | 2.25 | 2.25 | 2.75 | 3.75 | 4.25 | |
| 580 | 1.75 | 1.75 | 2.25 | 2.25 | 2.75 | 3.75 | 4.25 | |
| 575 | 1.75 | 1.75 | 2.25 | 2.25 | 2.75 | 3.75 | 4.25 | |
| 570 | 1.75 | 1.75 | 2.25 | 2.25 | 2.75 | 3.75 | | |
| 565 | 1.75 | 1.75 | 2.25 | 2.50 | 2.75 | 3.75 | | |
| 560 | 1.75 | 1.75 | 2.25 | 2.50 | 2.75 | 3.75 | | |
| 555 | 1.75 | 1.75 | 2.25 | 2.50 | 2.75 | 3.75 | | |
| 550 | 1.75 | 1.75 | 2.25 | 2.50 | 3.00 | 3.75 | | |
| 545 | 1.75 | 1.75 | 2.25 | 2.50 | 3.00 | | | |
| 540 | 1.75 | 1.75 | 2.25 | 2.75 | 3.00 | | | |
| 535 | 1.75 | 1.75 | 2.25 | 2.75 | 3.25 | | | |
| 530 | 1.75 | 1.75 | 2.50 | 2.75 | 3.25 | | | |
| 525 | 1.75 | 1.75 | 2.50 | 3.00 | 3.25 | | | |
| 520 | 1.75 | 1.75 | 2.50 | 3.00 | 3.25 | | | |
| 515 | 1.75 | 1.75 | 2.50 | 3.00 | | | | |
| 510 | 1.75 | 1.75 | 2.50 | 3.25 | | | | |
| 505 | 1.75 | 1.75 | 2.75 | 3.25 | | | | |
| 500 | 1.75 | 1.75 | 2.75 | 3.25 | | | | |

*Fig. 8c*

CREDIT REPORTING SOURCES — "C" 60x30 OR 1x60 & 1x90 OR 3x60

LTV →

| | 60 | 65 | 70 | 75 | 80 | 85 |
|---|---|---|---|---|---|---|
| 680 | 2.75 | 2.75 | 2.75 | 2.75 | 3.00 | 3.75 |
| 675 | 2.75 | 2.75 | 2.75 | 2.75 | 3.00 | 3.75 |
| 670 | 2.75 | 2.75 | 2.75 | 2.75 | 3.00 | 3.75 |
| 665 | 2.75 | 2.75 | 2.75 | 2.75 | 3.25 | 3.75 |
| 660 | 2.75 | 2.75 | 2.75 | 3.00 | 3.25 | 3.75 |
| 655 | 2.75 | 2.75 | 2.75 | 3.00 | 3.25 | 3.75 |
| 650 | 2.75 | 2.75 | 2.75 | 3.00 | 3.25 | 3.75 |
| 645 | 2.75 | 2.75 | 2.75 | 3.00 | 3.50 | 3.75 |
| 640 | 2.75 | 2.75 | 2.75 | 3.25 | 3.50 | 3.75 |
| 635 | 2.75 | 2.75 | 3.00 | 3.25 | 3.50 | 4.00 |
| 630 | 2.75 | 2.75 | 3.00 | 3.25 | 3.50 | 4.00 |
| 625 | 2.75 | 2.75 | 3.00 | 3.25 | 3.50 | 4.00 |
| 620 | 2.75 | 2.75 | 3.00 | 3.25 | 3.50 | 4.00 |
| 615 | 2.75 | 2.75 | 3.00 | 3.25 | 3.50 | 4.25 |
| 610 | 2.75 | 2.75 | 3.00 | 3.25 | 3.50 | 4.25 |
| 605 | 2.75 | 2.75 | 3.25 | 3.25 | 3.50 | 4.25 |
| 600 | 2.75 | 2.75 | 3.25 | 3.25 | 3.50 | 4.25 |
| 595 | 2.75 | 2.75 | 3.25 | 3.25 | 3.75 | |
| 590 | 2.75 | 2.75 | 3.25 | 3.25 | 3.75 | |
| 585 | 2.75 | 2.75 | 3.25 | 3.25 | 3.75 | |
| 580 | 2.75 | 2.75 | 3.25 | 3.25 | 3.75 | |
| 575 | 2.75 | 2.75 | 3.25 | 3.25 | 3.75 | |
| 570 | 2.75 | 2.75 | 3.25 | 3.25 | 3.75 | |
| 565 | 2.75 | 2.75 | 3.25 | 3.50 | 3.75 | |
| 560 | 2.75 | 2.75 | 3.25 | 3.50 | 3.75 | |
| 555 | 2.75 | 2.75 | 3.25 | 3.50 | 3.75 | |
| 550 | 2.75 | 2.75 | 3.25 | 3.50 | 4.00 | |
| 545 | 2.75 | 2.75 | 3.25 | 3.50 | 4.00 | |
| 540 | 2.75 | 2.75 | 3.25 | 3.75 | 4.00 | |
| 535 | 2.75 | 2.75 | 3.25 | 3.75 | 4.25 | |
| 530 | 2.75 | 2.75 | 3.50 | 3.75 | 4.25 | |
| 525 | 2.75 | 2.75 | 3.50 | 4.00 | 4.25 | |
| 520 | 2.75 | 2.75 | 3.50 | 4.00 | 4.25 | |
| 515 | 2.75 | 2.75 | 3.50 | 4.00 | | |
| 510 | 2.75 | 2.75 | 3.50 | 4.25 | | |
| 505 | 2.75 | 2.75 | 3.75 | 4.25 | | |
| 500 | 2.75 | 2.75 | 3.75 | 4.25 | | |

Fig. 8d

CREDIT REPORTING SOURCES — "D" 1x120, ox

LTV →

| | 60 | 65 | 70 | 75 |
|---|---|---|---|---|
| 680 | 4.50 | 4.50 | 4.50 | 4.50 |
| 675 | 4.50 | 4.50 | 4.50 | 4.50 |
| 670 | 4.50 | 4.50 | 4.50 | 4.50 |
| 665 | 4.50 | 4.50 | 4.50 | 4.50 |
| 660 | 4.50 | 4.50 | 4.50 | 4.75 |
| 655 | 4.50 | 4.50 | 4.50 | 4.75 |
| 650 | 4.50 | 4.50 | 4.50 | 4.75 |
| 645 | 4.50 | 4.50 | 4.50 | 4.75 |
| 640 | 4.50 | 4.50 | 4.50 | 5.00 |
| 635 | 4.50 | 4.50 | 4.75 | 5.00 |
| 630 | 4.50 | 4.50 | 4.75 | 5.00 |
| 625 | 4.50 | 4.50 | 4.75 | 5.00 |
| 620 | 4.50 | 4.50 | 4.75 | 5.00 |
| 615 | 4.50 | 4.50 | 4.75 | 5.00 |
| 610 | 4.50 | 4.50 | 4.75 | 5.00 |
| 605 | 4.50 | 4.50 | 5.00 | 5.00 |
| 600 | 4.50 | 4.50 | 5.00 | 5.00 |
| 595 | 4.50 | 4.50 | 5.00 | 5.00 |
| 590 | 4.50 | 4.50 | 5.00 | 5.00 |
| 585 | 4.50 | 4.50 | 5.00 | 5.00 |
| 580 | 4.50 | 4.50 | 5.00 | 5.00 |
| 575 | 4.50 | 4.50 | 5.00 | 5.00 |
| 570 | 4.50 | 4.50 | 5.00 | |
| 565 | 4.50 | 4.50 | 5.00 | |
| 560 | 4.50 | 4.50 | 5.00 | |
| 555 | 4.50 | 4.50 | 5.00 | |
| 550 | 4.50 | 4.50 | 5.00 | |
| 545 | 4.50 | 4.50 | 5.00 | |
| 540 | 4.50 | 4.50 | 5.00 | |
| 535 | 4.50 | 4.50 | 5.00 | |
| 530 | 4.50 | 4.50 | 5.00 | |
| 525 | 4.50 | 4.50 | | |
| 520 | 4.50 | 4.50 | | |
| 515 | 4.50 | 4.50 | | |
| 510 | 4.50 | 4.50 | | |
| 505 | 4.50 | 4.50 | | |
| 500 | 4.50 | 4.50 | | |

Fig. 8e

Finance America
Wholesale Rate Sheet
FAAST 1st Mortgage

Region 1 = Prepayment Penalty Allowed

| FAAST 1st SCORE | MAX LOAN | Margin | 2/28/2 | | | 5/25/5 | | | 30/30 FIXED | | |
|---|---|---|---|---|---|---|---|---|---|---|---|
| | | | Par | 1 Ysp | 2 Ysp | Par | 1 Ysp | 2 Ysp | Par | 1 Ysp | 2 Ysp |
| 0.75 | $650,000 | 575 | 8.990 | 9.750 | 10.750 | 9.750 | 10.375 | 11.250 | 9.990 | 10.625 | 11.375 |
| 1.00 | 650,000 | 575 | 9.125 | 9.875 | 10.875 | 9.875 | 10.500 | 11.375 | 10.125 | 10.750 | 11.500 |
| 1.25 | 650,000 | 575 | 9.250 | 9.990 | 10.990 | 9.990 | 10.625 | 11.500 | 10.250 | 10.875 | 11.625 |
| 1.50 | 650,000 | 575 | 9.375 | 10.125 | 11.125 | 10.125 | 10.750 | 11.625 | 10.375 | 10.990 | 11.750 |
| 1.75 | 650,000 | 575 | 9.500 | 10.250 | 11.250 | 10.250 | 10.875 | 11.750 | 10.500 | 11.125 | 11.875 |
| 2.00 | 550,000 | 600 | 9.625 | 10.375 | 11.375 | 10.375 | 10.990 | 11.875 | 10.625 | 11.250 | 11.990 |
| 2.25 | 550,000 | 600 | 9.750 | 10.500 | 11.500 | 10.500 | 11.125 | 11.990 | 10.750 | 11.375 | 12.125 |
| 2.50 | 500,000 | 600 | 9.875 | 10.625 | 11.625 | 10.625 | 11.250 | 12.125 | 10.875 | 11.500 | 12.250 |
| 2.75 | 500,000 | 600 | 9.990 | 10.750 | 11.750 | 10.750 | 11.375 | 12.250 | 10.990 | 11.625 | 12.375 |
| 3.00 | 450,000 | 625 | 10.125 | 10.875 | 11.875 | 10.875 | 11.500 | 12.375 | 11.125 | 11.750 | 12.500 |
| 3.25 | 450,000 | 625 | 10.250 | 10.990 | 11.990 | 10.990 | 11.625 | 12.500 | 11.250 | 11.875 | 12.625 |
| 3.50 | 400,000 | 625 | 10.375 | 11.125 | 12.125 | 11.125 | 11.750 | 12.625 | 11.375 | 11.990 | 12.750 |
| 3.75 | 400,000 | 625 | 10.625 | 11.375 | 12.375 | 11.250 | 11.875 | 12.750 | 11.625 | 12.250 | 12.990 |
| 4.00 | 350,000 | 650 | 10.875 | 11.625 | 12.625 | 11.500 | 12.125 | 12.990 | 11.875 | 12.500 | 13.250 |
| 4.25 | 350,000 | 650 | 11.250 | 11.990 | 12.990 | 11.875 | 12.500 | 13.375 | 12.250 | 12.875 | 13.625 |
| 4.50 | 350,000 | 650 | 11.625 | 12.375 | 13.375 | 12.250 | 12.875 | 13.750 | 12.625 | 13.250 | 13.990 |
| 4.75 | 350,000 | 650 | 11.990 | 12.750 | 13.750 | 12.625 | 13.250 | 14.125 | 12.990 | 13.625 | 14.375 |
| 5.00 | $200,000 | 700 | 12.375 | 13.125 | 14.125 | 12.990 | 13.625 | 14.500 | 13.375 | 13.990 | 14.750 |

FIG. 9

AUTOMATED LOAN EVALUATION SYSTEM

CROSS-REFERENCE

This invention claims the benefit of U.S. Provisional Patent Application 60/184,150 filed on Feb. 22, 2000.

BACKGROUND

This application relates generally to business methods for evaluating loans, and more particularly, to a system and method for providing a mortgage loan pricing model for various lending scenarios.

In general, loans are often classified as either a prime loan or a sub-prime loan. Sub-prime mortgage loans are loans which do not meet the criteria of the Federal National Mortgage Association and the Federal Home Mortgage Corporation (collectively, the "Agencies") for purchase by the Agencies. Typically, sub-prime loans have one or more credit issues related to the borrower which the Agencies have determined would increase the probability of the loan payments on such loans not being made to the lender when due.

There is a market for sub-prime loans, however, through whole loan purchasers and ultimately, through investors in securities other than those issued by the Agencies. However, pricing of such loans in the past has been driven primarily by guesswork and competition.

It is desired to remove some of this guesswork and provide a reliable, fair, and consistent evaluation for all loans, including sub-prime loans.

SUMMARY

In response to the above described problems and deficiencies, a methodology is provided for translating information from historical data relating to similar loans. The historic information can be used to evaluate loans, such as value-adjusted and/or risk-adjusted mortgages for residential sub-prime lending. The methodology may also convert the pricing model into a simple, user-friendly system for grading and pricing such loans.

In operation, the first step is to determine a credit grade for the subject borrower. This is determined by using only the mortgage history of the borrower. A credit report is reviewed to determine the borrower's 12 month mortgage history on the subject property or similar type property (e.g., primary residence if the new loan is for purchase of another primary residence). The reviewer determines how many payments were over 30, 60, 90 and 120 days late, and this review results in the labeling of the loan as A, A–, B, C or D credit grade.

In one embodiment, each credit grade has a separate Credit Score/Loan-to-Value ("LTV") matrix. This matrix considers two factors: the Credit Score, which is a Fair, Isaac credit ("FICO") score obtained from a three-company consolidated credit report, and the proposed loan-to-value for the subject loan. Based upon this matrix, a "base score" is obtained. For the sake of reference, these base scores are in 0.25 increments between 1.00 and 5.00.

Once the base score is obtained, various "Risk Add Ons" are added to the base score, as applicable. The purpose of these is to account for "add-on" risk factors considered by potential purchasers other than "multi-level" loan risk factors, such as LTV, Credit Score and mortgage payment history. Add-on risk factors may include, for example, such characteristics as Alternative Documentation, Stated Documentation (for self-employed borrowers), 3-4 unit property (rather than 1-2 unit), Non Owner Occupied, a combined LTV of more than 95%, cash out to the borrower, lack of mortgage history, excessive debt to income ratio, and prior bankruptcy filings. Other risk factors may be added, based upon conditions in the secondary market. The final Credit Score determines whether the mortgage loan should be made and, if so, at what rate.

An advantage of the present invention is that it avoids the impracticality of individually pricing each loan based upon unique characteristics. Instead, the system and method create groups of loans which, although not identical to each other, might reasonably be expected to perform in a similar manner and therefore, in a risk-adjusted environment, and should be priced the same.

DRAWINGS

FIG. 1 is a flow diagram illustrating one embodiment for developing probability of delinquency databases and procedures.

FIG. 2 is a flow diagram illustrating one embodiment of using the database developed according to the diagram illustrated in FIG. 1.

FIG. 3 is a flow diagram illustrating in detail one embodiment for developing probability of delinquency databases and procedures.

FIGS. 5a-5e are example tables illustrating probability of delinquency databases or tables.

FIG. 6 is an example probability of delinquency add-on table.

FIG. 7 is an example set of rules for the probability of delinquency add-on table of FIG. 6.

FIGS. 8a-8e are example tables illustrating credit score databases or tables.

FIG. 9 is an example rate sheet.

DETAILED DESCRIPTION

Figures 4A, 4B, 4C:
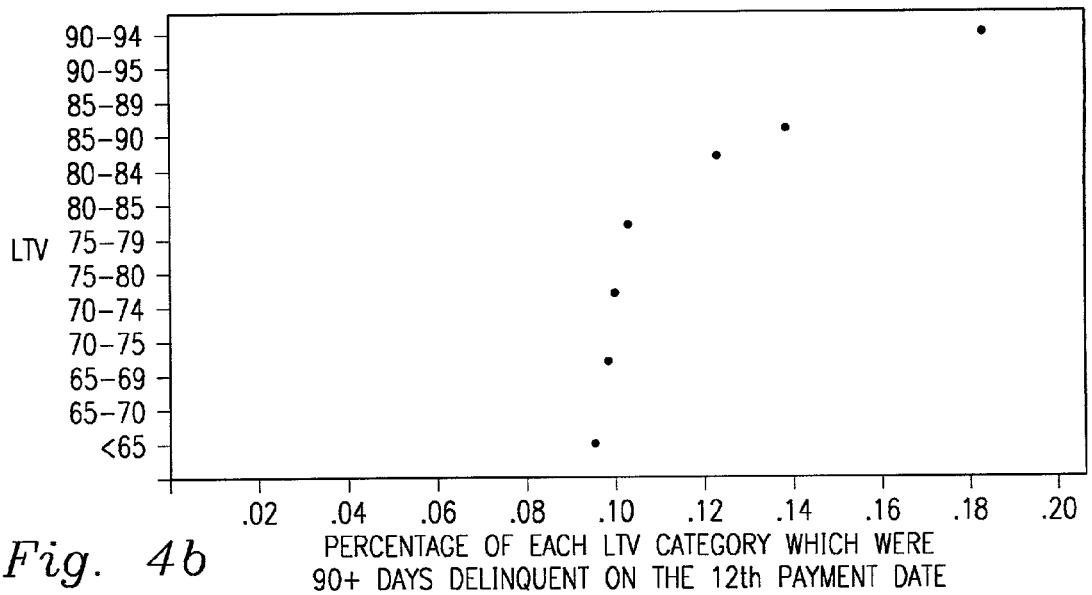
FIGS. 4a-4e are tables and associated graphs of an example set of loan data.

The present invention provides a unique system and method for evaluating loans. In one embodiment, the system and method provide risk-based pricing, taking into account those factors which make the loans "non-conforming" from the standpoint of the regulating agencies. At the same time, it simplifies the underwriting of these sub-prime loans. It is understood that the following disclosure provides many different embodiments, or examples, for implementing different features of this invention. Techniques and requirements that are only specific to certain embodiments should not be imported into other embodiments. Also, specific examples of numbers, ranges, and formats are described below to simplify the present disclosure. These are, of course, merely examples and are not intended to limit the invention from that described in the claims.

GLOSSARY

The present disclosure uses terms that are well know in the art of loan financing. For the sake of convenience, several of the terms are defined below.

Alternative documentation ("Alternative doc"): Verification of the borrower's income based on a limited set of documentation. A lesser requirement for documentation than "Full Documentation," usually consisting of personal bank statements.

Cash out: A loan where the borrower receives more than $1,000 of the loan proceeds.

Combined loan-to-value ratio ("CLTV"): The ratio calculated by dividing the sum of the principal balance of all loans constituting a lien against the subject property by the appraised value of the property or, if the loan is for purchase money, the lesser of appraised value or the purchase price.

FICO score: A credit reporting score assigned to a borrower created by calculations based upon the borrower's credit report; usually based upon a merger of two or three different credit reports. A higher score generally indicates a better credit history.

Debt-to-income ratio ("DTI"): The ratio calculated by dividing the borrower's total installment debt to third parties (including mortgages, automobile loans, and credit card loans) by the borrower's total gross income from all sources.

Full Documentation ("Full Doc"): All standard documentation and verification of debts and income provided Owner-occupied property: The borrower maintains the subject property as his or her own residence.

Stated documentation ("Stated Doc"): Applicable to self-employed borrowers only. Gross income of the borrower is assumed to be as stated by the borrower; only required evidence of income is the borrower's statement on an official Department of Housing and Urban Development approved form used in loan originations (e.g., a 1003 application).

System and Method Operation:

Referring now to FIG. 1a, a method 20 provides a broad overview of one embodiment for determining a probability of delinquency for a loan where several loan factors are known. The method 20 begins at step 22 where historic loan data is analyzed in light of various loan factors. The loan factors identified may include loan-to-value ratio, FICO score (obtained from a tri-party credit report), mortgage pay history, whether or not the loan was qualified using alternative documentation, whether or not the loan was qualified using stated doc (self-employed borrowers only), number of units (measured as 1-4), whether the property is owner occupied, the combined loan-to-value ratio (i.e., the ratio of all liens against the property to the appraised value of the property), whether the loan includes cash out to the borrower, debt-to-income ratio, and whether the borrower is currently in bankruptcy. It is important to note that other factors tracked by the origination system on a loan-level basis could also be used.

As will be explained in more detail below, at step 24 each loan factor is analyzed against historic loan delinquencies, so that a historic probability of delinquency may be determined for each loan factor. In step 26, a simplified procedure is developed so that applicable probability of delinquency for each loan factor may be combined into an overall probability of delinquency. Thus, many factors may be used to determine an overall probability of delinquency without the need for complex algebraic equations.

Once the overall probability of delinquency is determined, the price of the loan can be determined. Referring to FIG. 1b, a method 10 provides a broad overview of the pricing aspects of one embodiment. The method 10 is for pricing a potential loan for a client. The method 10 begins at step 12 where a credit grade is determined. The credit grade may be based on various types of loan factors. In one embodiment, the credit grade is based on historical information regarding loan payments (for other mortgage loans) over the last year. In one embodiment, a borrower's credit grade may be classified as an "A", "A–", "B", "C", and "D". As will be explained in greater detail below, this classification depends how many loan payments were over 30, 60, 90, and 120 days late. Once a credit grade is determined, a specific matrix or database can be chosen at step 14 which is specific for each credit grade. In one embodiment, each matrix includes a vertical axis of FICO scores from 500 to 680, and a horizontal axis of LTV ratios from 60% to 95%.

At step 15, a base probability of delinquency is determined from the chosen matrix. For instance, given a FICO score and a LTV for the loan in question, a process may easily determine the base probability of delinquency. Given that the FICO scores are represented by the vertical axis and the LTV ratio are represented by the horizontal axis, the probability of delinquency will be found in the cell which intersects the appropriate row and column. Thus, at step 16, the process determines the probability of delinquency from three different factors (payment history, FICO score, and LTV) by the use of matrixes without having to use complex equations.

At step 16, the probability of delinquencies representing the appropriate add-on values may then be independently calculated. At step 17, the base probability of delinquency may be combined with the probability of delinquencies due to the add-on factors to determine a total probability of delinquency.

At step 18, a predetermined rate sheet or database may be accessed and the probability of delinquency may be cross-referenced to a loan rate. Rate sheets are commonly used in the industry and are frequently adjusted to interest rates and other costs unrelated to the probability of delinquency. A price of the loan or loan rate will be determined from the rate sheet, which take into effect other pricing factors common in the industry, such as whether or not a pre-payment penalty may be assessed.

Referring to FIG. 2, the method 10 may be performed manually or on a computer 50. The computer 50 may be one or more mainframes, servers, wireless telephones, personal digital assistants, and the like. The computer 50 includes a processing unit 52, an input/output ("I/O") 54, and a storage 56. The I/O 54 may include a monitor and keyboard, an interface screen of a personal digital assistant, a network interface, or other communication module. The storage 56 may include a local memory including one or more local storage devices, as well as a remote memory with one or more remote storage devices. It is understood that each of the listed components may actually represent several different components, and some components may not be included in certain embodiments.

Risk of Delinquency and Matrix Creation:

The above described procedures and matrices are created by analyzing historic loan data. In the present embodiment, it is desired to determine the Probability of Delinquency of a loan with a specific set of characteristics. It is also desired to associate each Probability of Delinquency (or range thereof) to an interest rate reflecting the price of the loan. Furthermore, it is desired to create a format for presenting that information to employees involved in underwriting, lending and processing loans, third-party brokers and to borrowers in a simple and easily understood form.

Referring now to FIG. 3, a method 100 can be used to determine a probability of delinquency from a set of historical loan data. Execution begins at step 102 where potential loan factors that might affect risk of loan delinquency are identified.

As previously discussed, potential loan factors identified may include loan-to-value ratio, FICO score (obtained from tri-party credit report), mortgage pay history, whether or not the loan was qualified using alternative documentation, whether or not the loan was qualified using stated doc (self-employed borrowers only), number of units (measured as 1-4), whether the property is owner occupied, the combined loan-to-value ratio (i.e., the ratio of all liens against the property to the appraised value of the property), whether the loan includes cash out to the borrower, debt-to-income ratio, and whether the borrower is currently in bankruptcy.

At step 104, each factor is categorized as "multi-level" or "either-or." For simplicity, the number of multi-level factors may be limited to a particular number (e.g., four.) A multi-level factor is a factor with many gradations, e.g., LTV which may be anywhere from 1% to 100% (or potentially higher). An either-or factor has only two choices, e.g., owner-occupied or not. A multi-level factor may be converted to an either-or factor by locating a "break point" and changing the gradations to "above" and "below"; e.g., LTV's may be described as "90% and over" and "less than 90%." Either-or factors may also be referred to as add-ons factors. For instance, the unit will either be owner occupied or not. If the unit is not owner occupied, the probability of delinquency may be determined for this loan factor, and simply "added on" to the overall probability or score.

In some embodiments, the mortgage pay history is the single most significant indicator of performance. For purposes of this application, the term "performance" describes the situation when a borrower repays a loan according to its schedule. It can be thought of as the opposite of delinquency. LTV and FICO scores are also very significant, and their effect upon performance is gradual with performance improving gradually with decreases in LTV or increases in FICO scores, with other loan factors held constant.

At step 106, historic information for sub-prime loans is obtained and collected into a set. A very large historic information set from a variety of originators and servicers is desirable, since a large number will dilute the effect of anomalies in origination or servicing processes. The information set should include data on each loan in most or all of the categories identified in step 104 as loan factors which might affect the probability of delinquency. Historic information may be purchased directly from loan servicers.

Once the historic information set is obtained, the multi-level loan factors can be analyzed. However, in step 108, the data may have to be filtered to remove the effects of add-on factors and other circumstances. For instance, the incidence of delinquency is determined on a particular payment date. In one embodiment, this date is the $12^{th}$ payment date. Consequently, loans which were liquidated or paid off prior to the particular payment date should be excluded from the information set.

In addition, for purposes of determining the initial base score, only loans with no "add-on" factors should be included in the initial analysis. In other words, only full doc, 1-2 unit, owner occupied properties when there is no cash out to the borrower, the combined loan-to-value ratio is less than 95%, where the borrower has a debt-to-income ratio of not more than 45%, and where there is no existing bankruptcy. In one embodiment, loans where no previous mortgage loan history are be excluded for this analysis. Furthermore, one embodiment also excludes loans with LTVs of 95% from this analysis. In step 108, for analysis purposes, loans with these characteristics will be separated or filtered out into a separate group or pool. For convenience, this filtered pool will be referred to as "pool A."

After the information set has been filtered into pool "A," each multi-level loan factor may then be isolated. It is then possible, in step 110, to determine the actual incidence of delinquency at each level for a given loan factor. For multi-level loan factors with a large number of levels (e.g., LTV may have 100 or more), appropriate groupings may be made. Prior grouping may significantly reduce the complexity of matrixes in those embodiments using lookup tables or databases. However, the use of groupings should not adversely affect the accuracy of the tables. Thus, it may be necessary to ensure that the groupings selected will contain a statistically significant number of loans.

To illustrate the method 100 of FIG. 3, an example information set will be discussed. Referring to FIG. 4a, an information set of 15,000 loans has been filtered (i.e., no add-ons, etc.) and divided into groups by initial LTV increments of 5 for the range between 65 and 94 (see column (a) of FIG. 4a). Column (b) indicates the number of loans in each group for this example information set.

Column (c) represents the number of loans in each LTV grouping that are 90+days delinquent (on the $12^{th}$ payment date). Column (d) represents the probability of delinquency, which can be calculated from dividing the number of loans (column (b)) into the incidences of delinquency (column (c)). FIG. 4b graphically illustrates the relationship between the LTV groups and the probability of delinquency.

Referring to FIG. 4c, which continues analyzing the pool "A," pool "A" can be separated into additional groups or categories using the loan payment history. In one group, the borrower has 1 or no mortgage payments no more than 30 days late in past 12 months ("1×30"). In another group, the borrower has 2 mortgage payments no more than 30 days late in past 12 months ("2×30"). In another group, the borrower has 3 or 4 mortgage payments no more than 30 days late in past 12 months ("4×30"). In another group, the borrower has 1 mortgage payment 60 days late and 1 or 2 payments no more than 30 days late in the past 12 months ("2×30 & 1×60"). Additional similar groups can be created. Thus, column (a) of FIG. 4c lists the pay history groups. Column (b) indicates the number of loans in each group of the example information set. Column (c) represents the number of loans in each LTV grouping that are 90+days delinquent on the $12^{th}$ payment date of each loan.

Figures 4D, 4E:
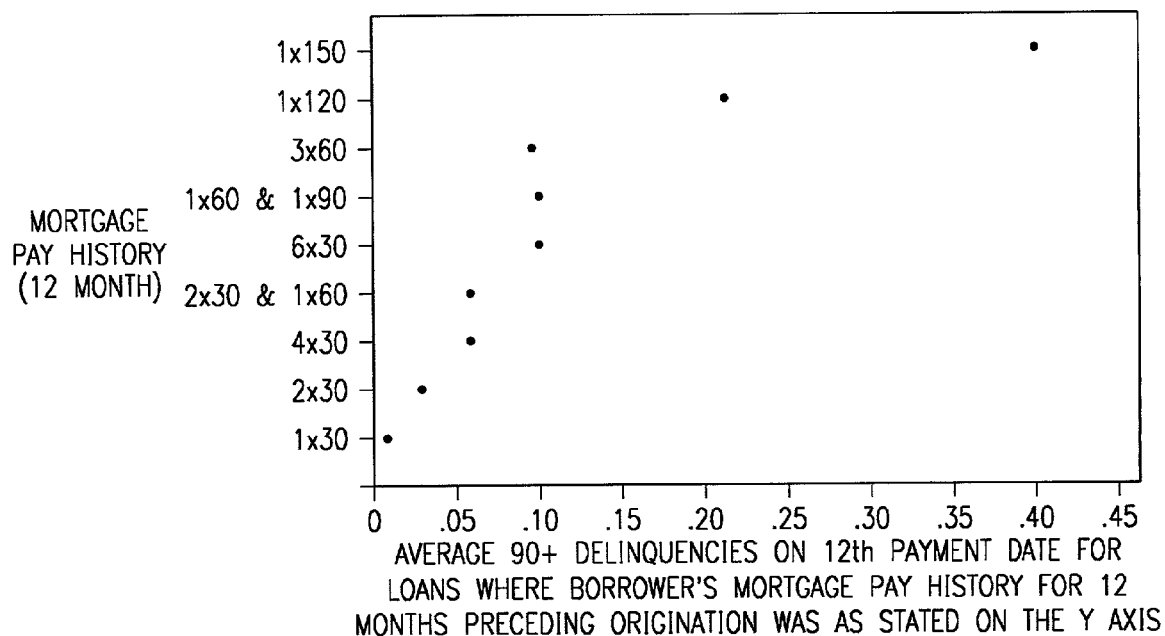

Column (d) represents the probability of delinquency, which can be calculated from dividing the number of loans into the incidences of delinquency. FIG. 4d graphically illustrates the relationship of each mortgage pay history group against the probability of delinquency.

Referring to FIG. 4e, the probability of delinquency for the pool "A" can also be compared to a credit history score, such as the FICO scores. Thus, column (a) of FIG. 4e lists the FICO scores in increments of 10 for the range between 520 and 680. Column (b) indicates the number of loans in each group of this particular information set. Column (c) represents the number of loans in each LTV grouping that are 90+ days delinquent at the $12^{th}$ payment date. Column (d) represents the probability of delinquency, which can be calculated by dividing the number of loans into the incidences of delinquency.

Referring back to FIG. 3, it is desirable to calculate the probability of delinquency for a given loan based on all of the multi-level loan factors (e.g., LTV, mortgage pay history, credit score). As will be explained in detail below, when matrixes or tables are used to store historic data, the probability of delinquency for each combination of factors may be determined by: selecting the most significant loan factor (step 112); dividing the most significant loan factor into groups (step 114); sorting the groups (step 116); and creating a matrix for each group where the matrix reflects the contributions of the other two loan factors (step 118).

Continuing with the example of pool "A", FIGS. 4*a*, 4*c*, and 4*e* show the correlation between the probability of delinquency and the respective loan factors (i.e., mortgage pay history, FICO score, and LTV). The probability of delinquency of the top two rows in FIG. 4*c* (the mortgage pay history) are significantly greater than the probability of delinquency reflected in any row of FIGS. 4*a* and 4*b* (the LTV and FICO scores, respectively). Assuming that actual information sets are similar to the example above, it can be assumed that the mortgage loan history loan factor is the single most significant indicator of delinquency. In this context, "most significant" means the factor which appears to correlate most directly with probability of delinquency.

Referring back to FIG. 4*d*, significant breaks and congruencies in the probability of delinquency for mortgage loan history are located and used to establish credit grades (initially designated A, A–, B, C and D) for each level of mortgage pay history. FIG. 4*d* shows that the 1×30 level clearly outperforms other mortgage pay history levels. For simplicity, this level may be designated as an "A" credit grade. The 2×30 level is 2.5 times more likely to default than 1×30 level, but half as likely to default as 4×30 level. Thus, borrowers with 2×30 mortgage loan history may be designated as an "A–" credit grade. The 4×30 and 2×30 & 1×60 levels have almost identical probabilities of delinquency, and thus can be designated together as a "B" credit grade. The 6×30, 1×60 & 2×90, and 3×60 levels are 50% more likely to default than either 4×30 or 2×30 & 1×60, and the probabilities of default in these three levels are very close. These levels may also be designated together as a "C" credit grade. The 1×120 level of loans clearly has a higher probability of default than any other level. These loans are designated as "D" credit grade. Borrowers whose mortgage pay history includes a payment more than 120 days delinquent during the past 12 months are considered extremely high risk and are excluded from consideration altogether.

Once credit grades are established (step 114 of FIG. 3) and sorted (step 116 of FIG. 3), matrixes can be developed for each credit grade (step 118 of FIG. 3) indicating the relationship of the other multilevel loan factors (e.g., FICO score and LTV) at the respective credit grade. In other words, for each credit grade, the relationship between the FICO score, the LTV, and the probability of delinquency may be determined.

To illustrate, refer to Table 1, below, which uses the pool "A" discussed above. Table 1 shows the specific number of loans in each credit grade established at step 114.

TABLE 1

| Grade | Mortgage Pay History Level | Number of Loans |
| --- | --- | --- |
| A | (1 × 30) | 750 |
| A– | (2 × 30) | 1000 |
| B | (4 × 30 and 2 × 30 + 1 × 60) | 4000 |
| C | (6 × 30 and 1 × 50 + 1 × 90 and 3 × 60) | 6750 |
| D | (1 × 120 max) | 1500 |

To create a series of matrixes, the loans in each Credit Grade can be separated into subpools, first by FICO score, then by LTV. At step 118 of FIG. 3, a series of analyses can then be performed, calculating the probability of delinquency in each combination of FICO score and LTV. The calculation of probability of delinquency would be made similar to the process discussed in reference to FIGS. 4*a*-4*e*, above. Then, for each Credit Grade, a matrix can be created showing the probability of delinquency for each FICO score/LTV combination in each Credit Grade. FIGS. 5*a*-5*e* illustrate example matrixes for each credit grade created from the pool "A". For example, the matrix illustrated in FIG. 5*a*, contains seventeen levels of credit reporting scores (along the y-axis) and six levels of LTVs creating 102 cells (17×6=102). Therefore, the value of each cell in the matrix contains the probability of delinquency for the subpool of loans having a particular credit grade, credit reporting score, and LTV.

Creating Add-ons:

Turning back to the example information set, those loans filtered out into other pools (i.e., those loans with add-on factors) at step 108, may now be analyzed. These pools of loans may be sorted for those loans which have one, but no more than one, add-on factor. In step 120, these loans can then be separated into Pool B (alternative docs), Pool C (stated doc), Pool D (3-4 unit properties), Pool E (non-owner occupied properties), Pool F (those loans where the CLTV at origination was >95%), Pool G (those loans where there was cash out), Pool H (DTI over 45%), and Pool I (existing bankruptcies). Alternatively or in addition, other factors which have an apparent effect on incidence of delinquency and for which there is adequate data may be added.

For each loan pool, in step 122, a risk of delinquency associated with the respective loan factor may be determined. For instance, from the example information set, if pool E consisted of 200 loans and had an incidence of delinquency of 10, the probability of delinquency associated with pool E (and the respective loan factor of non-owner occupation) would be 10/200 or 0.05. Similar risks of delinquencies may be created for each "add-on" factor. In embodiments that use charts and tables, an "add-on" table may be created. Rules for using the table may also be published. An example add-on table is illustrated in FIG. 6. An example set of rules for using the add-on table of FIG. 6 is illustrated in FIG. 7. In embodiments using computer devices, add-ons may simply be "flagged" during the initial data entry. During processing, all of the flags are tested, if a flag for a particular loan factor is set, the corresponding probability of delinquency is added to the total probability of delinquency variable.

Operation:

Once the matrixes have been created and the add-on factors calculated, the overall risk of delinquency may be determined for any given borrower, and a corresponding loan rate may then be determined. Referring back to FIG. 1*b*, the overall risk of delinquency associated with any given loan may be found by: determining the credit grade (step 12), selecting the matrix or database associated with the credit grade (step 14), determining a base risk of delinquency from the applicable matrix (step 15), determining the risks of delinquency for the applicable add-on factors (step 16), and combining the risks to arrive at a total risk of delinquency (step 17).

For instance, assume a borrower has had a mortgage history of 2 late payments of less than thirty days, the applicable credit score is 596, the LTV is 78, and the owner will not occupy the property. From Table 1, it is determined that the borrower's credit grade is A–, thus the matrix illustrated in FIG. 5*b* is selected. Using a FICO score of 596 and an LTV of 78, the base risk of delinquency can be determined from FIG. 5*b* to be 0.0624. Because the owner does will not occupy the property, the add-on risk of 0.05 is also added to the base risk. The overall risk of delinquency for the example loan, therefore, is 0.1124.

Once the total risk of delinquency is calculated, the loan rate may now be obtained using the following formula:

$$P = \frac{[F(A)C + L - C(L) + G]}{AC}$$

Where
P=Loan Rate
F=Funding Rate (i.e., cost of funds)
A=Average Life of Loan (i.e., number of years to average payoff)
C=Percentage of loans that are not delinquent (i.e., 90 days late at 12 months)
L=Expected Loss in points (this value will vary with the LTV, it also varies from state to state)
G=Profit Goal (hoped-for premium in the market)

For illustrative purposes, certain assumptions will be made. It is understood, however, that different assumptions can be made for different scenarios, and the assumptions are not meant to limit the invention. For purposes of example, expected Loss will be held constant at 40 percent.

Average Life will be assumed to be 2.0 years. The Funding Rate will be assumed to be 7 percent. The Profit Goal is set for each individual product (e.g., fixed, ARM, 2/28 or 5/25). The state in which the property is located will also affect the Loan Rate because the state will affect Average Life, due to existence of prepayment penalties, and Expected Loss, due to time necessary for foreclosure. The calculation of Funding Rate is currently an interest rate on warehouse lines of credit, but may eventually include the cost of funding through securitization, which is based upon the weighted average coupon of the issued securities and the required over collateralization level.

The variable "C" is the percentage of performing loans, expressed as a percentage. This value is:

$$C = (1 - \text{Total Probability of Delinquency}) \times 100$$

To illustrate, assume the following:
P=Loan Rate, the variable to be solved
F=Funding Rate (7%)
A=Average Life (2 years)
C=Performing Loans (95%)
L=Expected Loss (40%)
G=Profit Goal (5%)

Inserting the above variables into the following loan rate equation yields:

$$P = \frac{[7(2)95\% + 40 - 95\%(40) + 5]}{2 \times 95\%}$$

$$= \frac{13.3 + 40 - 38 + 5}{180\%}$$

$$= \frac{20.3}{1.8}$$

$$= 11.28\%$$

The loan rate (P), therefore, may be readily determined.

ALTERNATIVE EMBODIMENTS

As previously discussed, the above pricing process may be implemented on a personal computer, an Internet webpage, or a personal digital assistant (such as a Palm handheld device). It is also possible to use charts or tables to implement the pricing process. If charts are used, it may be desirable to use credit scores rather than using risks or probabilities. Credit scores may be easier for loan officers to manipulate. Furthermore, it may not be desirable to have a borrower know that he or she is at a particular delinquency risk.

For the sake of example, the base credit scores are arbitrarily assigned a value from 1.00 to 5.00 (changing in 0.25 increments). Then, each probability matrix (FIG. 5a-5e) can be translated to tables consisting of base credit scores. In this example, 1.00 base credit score will represent the least probability of delinquency; a 5.00 will represent the maximum probability of delinquency which the company has determined to assume for any individual loan. Table 2, below provides one way of cross referencing the base credit scores to the probability of delinquencies.

TABLE 2

| Credit Score | Risk of Delinquency |
|---|---|
| 1.00 | 0 |
| 1.25 | .0156 |
| 1.50 | .0312 |
| 1.75 | .0468 |
| 2.00 | .0624 |
| 2.25 | .0780 |
| 2.50 | .0936 |
| 2.75 | .1092 |
| 3.00 | .1248 |
| 3.25 | .1404 |
| 3.50 | .1506 |
| 3.75 | .1716 |
| 4.00 | .1872 |
| 4.25 | .2028 |
| 4.50 | .2184 |
| 4.75 | .2340 |
| 5.00 | .2496 |

With the correlation data from Table 2, the matrixes of FIGS. 5a-5e can be converted to the tables of 6a-6e, respectively. Thus, given a credit grade, a credit reporting score, and an LTV, it is possible to determine a base "credit score" from the tables illustrated in FIGS. 8a-8e. For instance, using a known FICO score and a LTV for the loan in question, a user may determine the base credit score by reading the corresponding value from the appropriate table. The user simply locates the FICO score on the vertical axis to determine a row, locates the LTV ratio on the horizontal axis a column, and the base credit score will be found in the cell which intersects the respective row and column. Thus, the user will be able to determine the base credit score from three different factors (payment history, FICO score, and LTV) without having to use complex equations.

Similarly, the risks of delinquency due to add-on factors may also be converted into a credit score. With the information derived above, an add-on table (such as in FIG. 6) can then be created. Thus, once a user has determined the base score, the user may simply add to the base score any applicable add-on factors to arrive at a total credit score. In the present example, each risk factor has an add-on ranging from 0.25 to 3.25. This number is added to the base score to determine the final "Credit Score".

Rates sheets may then be developed based on the final credit score. An example rate sheet is illustrated in FIG. 9. Rate sheets are commonly used throughout the industry.

The process and information provided above may be distributed in various manners. It may be part of a computer program, such as can be performed by the computer 50 of FIG. 2. It also can be physically published in tables and charts for use. The information can include: 1) Credit Grade Determination; 2) Matrices for each Credit Grade showing LTV and FICO score yielding Credit Score; 3) a Table for add-ons; and 4) Pricing sheets showing the appropriate rate for various Credit Grade and LTV combinations (if applicable, separating out different loan products and states). This information can be used in method 10 of FIG. 1, as discussed above.

It is understood that modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

What is claimed:

1. A method comprising:
   (a) obtaining a first payment history, a first Loan-to-Value ("LTV"). a first credit rating, and at least one add-on loan factor for a particular borrower of a loan, and a set of historic loan data comprising records having historic payment histories, historic LTVs, historic credit ratings, and at least one historic add on loan factor;
   (b) separating the records of historic loan data into a first pool based on the absence of the at least one historic add-on factor;
   (c) grouping the first pool into groups based on the historic payment histories, the historic LTVs, and the historic credit ratings;
   (d) determining a first probability of delinquency for the particular borrower by calculating a first incidence of delinquency of one group of the first pool;
   (e) separating the records of historic loan data into a second pool based on whether the records contain the at least one historic add-on factor;
   (f) grouping the second pool into sub-pools based on the at least one historic add-on factor;
   (g) determining a second probability of delinquency for the particular borrower by calculating a second incidence of delinquency of one subpool of the second pool; and
   (h) combining the first probability of delinquency with the second probability of delinquency to determine the total probability of delinquency for the particular borrower.

2. The method of claim 1, wherein step (c) further comprises:
   (a) dividing the first pool into a plurality of levels based on the historic payment histories, and
   (b) dividing the levels into a plurality of groups based on the historic LTVs and the historic credit ratings.

3. The method of claim 1, wherein the one group of the first pool has a second payment history with a first predetermined amount of the first payment history, a second credit rating within a second predetermined amount of the first credit rating, and a second LTV within a third predetermined amount of the first LTV.

4. The method of claim 1, wherein the first probability of delinquency is transformed into a base credit score.

5. The method of claim 1, wherein the second probability of delinquency is transformed into an adjustment to the base credit score.

6. The method of claim 1, wherein the at least one add-on loan factor is selected from the group consisting of: alternative documentation, stated documentation, number of units, owner occupation, no mortgage history, combined loan-to-value ratio, cash out, debt-to-income ratio, and bankruptcy.

* * * * *

UNITED STATES PATENT AND TRADEMARK OFFICE
CERTIFICATE OF CORRECTION

PATENT NO. : 7,310,618 B2 Page 1 of 1
APPLICATION NO. : 09/790374
DATED : December 18, 2007
INVENTOR(S) : Brian L. Libman It is certified that error appears in the above-identified patent and that said Letters Patent is hereby corrected as shown below:

Title page, item [73] Assignee, "Lehman Brothers, Inc., New York, NY (US)" should read --Lehman Brothers Bank, FSB, Wilmington, DE--

Signed and Sealed this

Sixth Day of January, 2009

JON W. DUDAS
*Director of the United States Patent and Trademark Office*